(No Model.)

H. E. KIRSTEIN.
SPECTACLE FRAME.

No. 589,437. Patented Sept. 7, 1897.

WITNESSES:
N. E. Paige
J. Norman Dixon,

H. E. Kirstein,
INVENTOR:
By his Attorneys,
Wm. E. Strawbridge
J. Bonsall Taylor

THE NORRIS PETERS CO., PHOTO-LITHO., WASHINGTON, D. C.

UNITED STATES PATENT OFFICE.

HENRY E. KIRSTEIN, OF ROCHESTER, NEW YORK.

SPECTACLE-FRAME.

SPECIFICATION forming part of Letters Patent No. 589,437, dated September 7, 1897.

Application filed April 3, 1897. Serial No. 630,579. (No model.)

*To all whom it may concern:*

Be it known that I, HENRY E. KIRSTEIN, a citizen of the United States, residing at Rochester, in the county of Monroe and State of New York, have invented certain new and useful Improvements in Spectacle-Frames, of which the following is a specification.

My invention relates generally to the frames of spectacles as distinguished from those of eye glasses, and relates especially to the bridges of spectacle frames, which, as is well known, are formed of strips or wires of more or less rigid metal, the intermediate or central portions of which are bent into arched forms to constitute saddles which rest upon the bridges of the noses of the wearers, and the respective end portions of which constitute arms which project forwardly, and the free ends of which are connected to the respective lenses or lens frames.

In different individuals, the height, breadth, and angle, of the nose, the distance of the eyes from the nose, the projection of the eyeballs, length of the eye-lashes, and projection of the eye-brows, vary considerably, and, inasmuch as the lenses must be supported concentrically with respect to the pupils of the wearer, it is obvious, that the optician in fitting the frame to the wearer, must, in view of all these conditions, subject the parts of the bridge to a large amount of manipulation.

In practice it has been found that this manipulation upsets and distorts the metal of the bridge, and that consequently the bridges are weakened and break easily, especially at the point of the junction of the saddles and arms.

It has, moreover, been found that in the fitting of spectacles it is impossible to lengthen the arms, for instance to give the lenses additional projection to the front, without at the same time diminishing the length of the saddles.

It has, likewise, been found that the manipulation of the arms to one or the other side, tends to alter the breadth of the saddle, and, in brief, as spectacles have heretofore been constructed, it has been very difficult to adjust one part without at the same time occasioning mal-adjustment of the other.

My invention comprehends the provision of a spectacle bridge, the material of which is at the junctions of the saddle and arms bent to form helical coils, arranged as hereinafter described.

In the accompanying drawings, Figure 1 is a view in perspective of a pair of spectacles provided with a bridge embodying a preferred form of my invention.

Similar letters of reference indicate corresponding parts.

In the accompanying drawings,

A A are a pair of lenses, provided with lens frames $a$ connected to which are applied the temples C.

B is a bridge formed of metal of any preferred and usual character, the central portion of which is bent into arched form to constitute the saddle $b$, and the respective extremities of which, constituting arms $b'$, project forward, and are connected to the lens frames $a$.

The metal of the bridge is, as shown, bent to form two spiral or helical coils $b^\times$, situated respectively at the junctions of the saddle $b$ and arms $b'$, and continuous of said saddle and arms.

Figure 1:
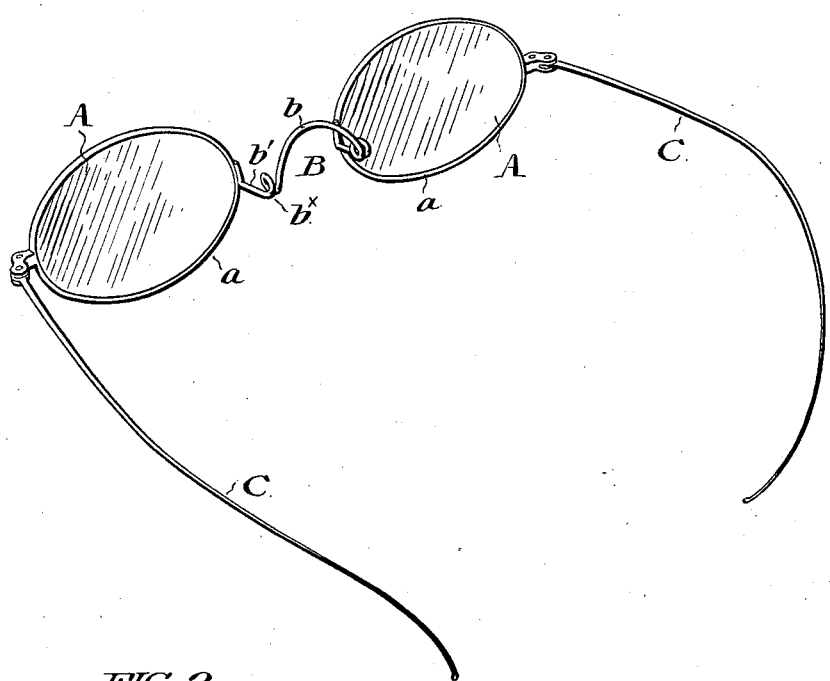
Figure 2:
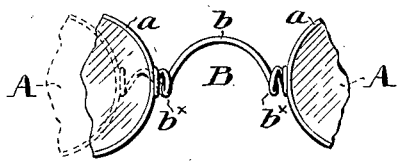
Figure 2 is a view in rear elevation of a typical embodiment of my improved bridges, showing portions of the lens frames and lenses to which the respective extremities of the frames are connected.
Figure 3:
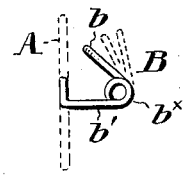
Figure 3 is a view in side elevation of the bridge.

The advantages of these features of my improved spectacle bridge are,—that the arms $b'$ may be lengthened by reducing the diameter of the coils $b^\times$, so that a portion of the substance of the coil may serve as an additional length of the arm;—that the lenses may be drawn away from each other by suitable axial extension of the helical coils, as shown in dotted lines of Figure 2, without, as in the usual forms of spectacle bridges, distorting the saddle or carrying the lenses back toward the eyes of the wearer;—that the length of the arms $b'$ may be shortened by increasing the diameter of the coils $b^\times$;—that the saddle itself may, by enlarging or diminishing the size of the helical coils, and by extending or shortening the coils be quickly and easily adjusted without interfering with the adjustment of the arms, or the relation of the lenses to each other;—and that the saddle may be swung forwardly or backwardly without disturbing the set of the arms as shown in dotted lines of Figure 3.

In a word the coils constitute an amount of surplus metal, so to speak, in the bridge, arranged in such manner and form as to be capable of being taken up in the several parts of the bridge when the latter are lengthened, and so disposed that the parts of the bridge may be adjusted without interfering the one with the other, the surplus metal being arranged in a compact, neat, and inconspicuous form, whereby the light and sightly appearance of the spectacle frames as a whole are not detracted from.

Having thus described my invention, I claim—

In combination with the lenses and temples of a spectacle, a spectacle nose bridge composed of a pliable metal, and consisting of a saddle and arms continuous of said saddle, the free ends of which arms make connection with the lenses, the metal at the junctions of the saddle and arms being bent to form non-resilient coils, the axes of which are substantially parallel to the plane of the lenses, as specified.

In testimony that I claim the foregoing as my invention I have hereunto signed my name this 26th day of March, A. D. 1897.

HENRY E. KIRSTEIN.

In presence of—
WM. P. CHASE,
HARRY B. BOWEN.